June 8, 1926.
R. E. COX
GAUGE CONNECTION
Filed Jan. 4, 1924
1,588,312
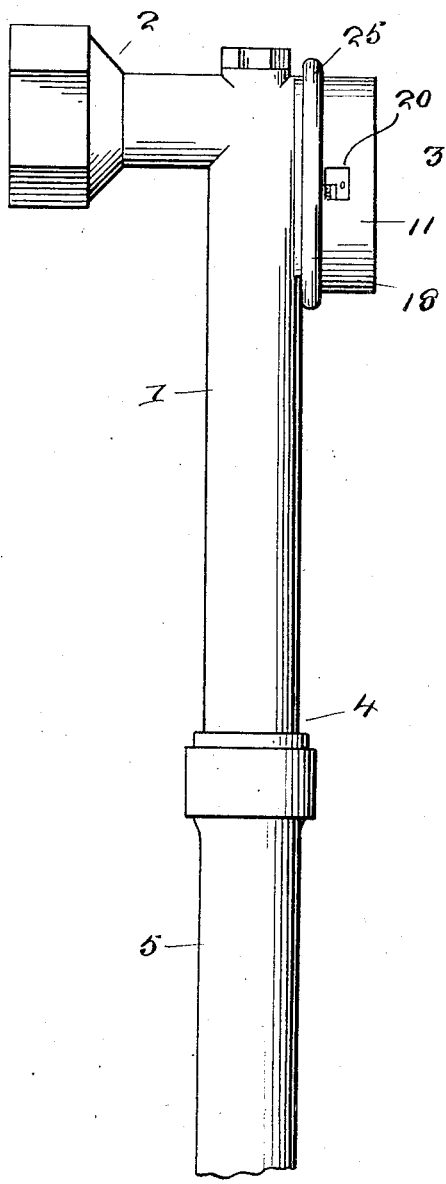
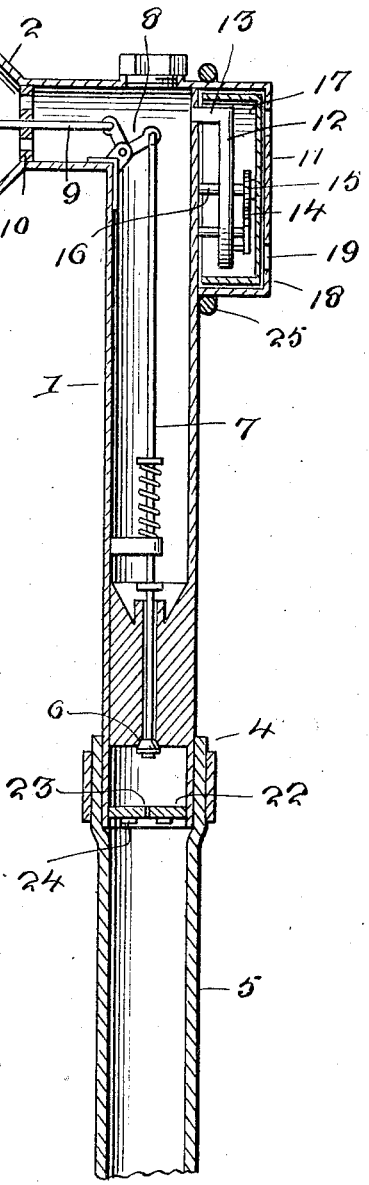
Rose E. Cox. INVENTOR
BY Victor J. Evans ATTORNEY Patented June 8, 1926.

1,588,312

UNITED STATES PATENT OFFICE.

ROSE ETTA COX, OF OROVILLE, CALIFORNIA.

GAUGE CONNECTION.

Application filed January 4, 1924. Serial No. 684,407.

This invention relates to a gauge for gauging the pressure in automobile and other pneumatic tires, the general object of the invention being to provide means for indicating the pressure while the air is being supplied to the tire.

Another object of the invention is to provide means for opening the control valve in the supply line when the gauge is placed upon the valve stem.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a side view of the device.

Figure 2 is a longitudinal sectional view through the device.

In these views, 1 indicates an L-shaped body which has a head 2 at the end of its short arm which is provided with a seat 3 for receiving the valve stem of a tire. The long arm is provided with a nipple 4 for receiving the end of the hose 5 which leads to a source of supply. This end of the body is provided with a spring controlled valve 6 which is normally closed to prevent air from entering the body from the hose. The stem 7 of this valve is connected to one arm of a bell crank 8 which is pivoted in the body at the junction of the two arms and a rod 9 is pivoted to the other arm of the bell crank and has its opposite end adapted to be engaged by the end of the valve stem. The rod 9 passes through a spider 10. A sight gauge 11 is placed on the top of the body, said gauge including the bent tube 12 which has its end 13 in communication with the body and its closed end connected with a rack 14 which engages a pinion 15 on a shaft 16 to which a cup-shaped dial 17 is connected. A cap 18 covers these parts and this cap is provided with two top openings 19 and the two side openings 20 through which the scales on the top and sides of the dial can be seen.

It will thus be seen that when the device is pressed upon the valve stem of a tire the end of the stem will engage the rod 9 so that the bell crank will be rocked upon its pivot and the stem 7 pressed inwardly to force the valve 6 off its seat so that the compressed air can flow through the device into the tire to inflate the same. The pressure within the body will act upon the tube 12 and this movement of the tube will be communicated to the shaft 16 through the gears 14 and 15 so that the dial will be revolved and thus bring the scales at the openings so that the pressure of the air being introduced into the tire can be read without removing the device from the stem. By having the numerous openings and scales the pressure can be read from different positions.

A disc 22 is screwed into the body of the gauge between the control valve and the supply line which is provided with a small opening 23 and the lugs 24 which permit it to be screwed into place. The hole 23 is of such a size as to admit just enough air into the device that will pass the tire valve so as to prevent back pressure in the gauge which would cause the gauge to indicate a greater amount of pressure than exists in the tire.

A band of resilient material, shown at 25 is placed around the gauge 11 to protect the same from shocks and jars due to rough handling of the device.

What I claim is:—

A device of the character described including an L-shaped tubular arm, a nipple at one end of the longer portion of said arm, a spring controlled valve within the nipple, a removable flexible seat at the shorter end of the arm, a bell crank at the junction of the parts of said L-shaped arm, a stem forming connection between the bell crank and the spring controlled valve, a rod having connection with the bell crank, a spider fastened in the arm through which the said rod is movable and means adapted to be passed through the flexible seat and engaging the rod for actuating the bell crank to unseat the spring controlled valve.

In testimony whereof I affix my signature.

ROSE ETTA COX.